United States Patent Office 3,575,753
Patented Apr. 20, 1971

3,575,753
METHOD OF MAKING A LEATHER-LIKE LAMINATED MATERIAL HAVING A POLYVINYL ACETALIC POROUS LAYER
Mitsuru Maruya, Tokyo, and Yoshio Oono and Bunji Fukuda, Ichikawa, Japan, assignors to Kanegafuchi Boseki Kabushiki Kaisha
No Drawing. Filed Nov. 15, 1968, Ser. No. 776,275
Int. Cl. B32b 5/18
U.S. Cl. 156—77          11 Claims

ABSTRACT OF THE DISCLOSURE

This invention relates to a new method of making a leathery porous sheet material consisting of a polyvinyl acetalic porous layer and a fibrous base layer.

---

It is known to prepare man-made or synthetic leathery materials by forming a porous layer of a synthetic resin on one or both surfaces of a base fabric (woven fabric or non-woven fabric) of natural or synthetic fibers. Most typically the resins used for forming such porous layers are polyurethanes, polyamides, polyvinyl-acetates and -chlorides. However, conventional synthetic leathery materials have various drawbacks. Thus, for example, the porous sheet is formed of a hydrophobic synthetic resin such as mentioned above, and therefore it is low in the porosity with the result that it is low in the moisture-permeability, gas-permeability, hygroscopicity and moisture-dissipation (water-dissipation).

We have made extensive researches with a view to make new leathery porous sheet materials in which are no such various difficulties as in conventional synthetic leathers, and have found that a tough flexible leathery porous sheet material which is high in the moisture-permeability, gas-permeability and moisture-dissipation (water releasability) can be made industrially easily by forming a polyvinyl acetalic porous layer integrally on one or both surfaces of a fibrous base layer, subjecting the laminate or assembly to a further acetalization with an aldehyde and an acid catalyst (such further acetalization shall be referred to a reactalization hereinafter) and then heating the same under pressure or compression.

The important features of the present invention are as follows:

(1) By reacetalizing in the presence of an aldehyde and acid catalyst a laminate made by integrally forming a polyvinyl acetalic porous sheet (of a porosity of 60 to 90% and an acetalization degree of 50 to 65 mol percent) on one or both surfaces of a fibrous base layer, the acetalization degree of the polyvinylacetalic porous layer can be increased up to 70 to 80 mol percent. Further, the mechanical strength when wet, softness, water-resistance and heat-resistance of the polyvinyl actalic porous sheet can be remarkably improved without impairing its inherent porosity characteristic. Further, as a result of this reacetalizing treatment, the subsequent heat treatment under pressure is facilitated.

(2) By heating, compressing and shaping the porous sheet of a porosity of 60 to 90% and an acetalization degree of 70 to 85 mol percent resulting from the reacetalizing treatment, the porosity of the polyvinyl acetalic porous layer can be adjusted to be in a range of 30 to 50% and its gas-permeability, moisture-permeability, tensile strength and heat resistance (such as thermoshrinkage resistance) required for leather substitutes can be further improved.

(3) Such effect obtained by the method of the present invention to improve the properties of the polyvinyl acetalic porous layer mentioned above is realized only by the combination of the above mentioned particular steps, i.e. integral application of a polyvinyl acetalic porous layer on one or both surfaces of a fibrous base layer, subsequent reacetalizing treatment, and subsequent heat treatment under compression. If either treatment is omitted, the objective product will not be obtained.

(4) Said porous sheet material obtained by the method of the present invention is a leathery porous sheet of a structure in which a porous layer of a polyvinyl acetal having fine continuous pores is firmly bonded and laminated on one or both surfaces of a fibrous base sheet material, and is excellent in the properties required for leather substitutes such as moisture-permeability, gas-permeability, compression-resistance, mechanical strength and feel. Particularly it is not only comparatively high in the hygroscopicity and absorbency for sweat and water but has also characteristics that it is high in the moisture-dissipation (water releasability) and easy to dry. These characteristics have not been in such conventional synthetic leathers as of polyurethane and polyamide.

In carrying out the method of this invention, a reaction solution prepared by mixing an aldehyde, acid catalyst and, if desired, a pore forming agent such as starch, with an aqueous solution of polyvinyl alcohol is applied to one or both surfaces of a fibrous base layer. The whole is then heated to a required reaction temperature so as to effect the desired acetalization. Thereafter, the resulting sheet material is water-washed to remove the remaining aldehyde, acid catalyst and pore producing agent, and is dried. In such case, the acetalizing reaction of the polyvinyl alcohol proceeds gradually on the base fabric and the acetalide product coagulates or cures in the form of a network structure, with a result that a polyvinyl acetalic porous layer having uniform micropores as firmly bonded on the base fabric is obtained.

The base fabric to be used in the method of the present invention is a woven fabric, knitted fabric or nonwoven fabric made of suitable natural or artificial fibers such as cotton, viscose, polyvinylidene chloride, polyvinyl acetal, polyethylene, polypropylene, polyacrylonitrile, polyurethane, polyester, polyamide or glass. Preferable among them are fibers of polyvinyl acetal, polyolefin, polyacrylonitrile, polyester or polyamide. The most preferable are polyvinyl acetalic fibers.

In this initial acetalization reaction, it is essential to properly select the reaction temperature and reaction time or the condition of the addition of a pore forming agent so that the acetalization degree of the resulting porous polyvinyl acetal layer would be 50 to 65% by mol and its porosity would be 60 to 90%. For this purpose the reaction temperature is usually selected in the range of 30 to 70° C., preferably 40 to 60° C. The reaction time is preferably in the range of 5 to 30 hours.

The polyvinyl alcohol to be used in the present invention is obtained in a known manner by saponifying polyvinyl acetate and is of 0 to 10 mol percent in the residual acetic acid group and of a polymerization degree in the range of 800 to 2500.

Examples of aldehydes to be used are aliphatic aldehydes such as formaldehyde, acetaldehyde, butylaldehyde, 2-ethylhexylaldehyde, laurylaldehyde and glyoxal, and aromatic aldehydes such as benzaldehyde. Among them, formaldehyde is most preferable.

The amount of such aldehyde is generally 5 to 15% by weight, preferably 8 to 12% by weight on the polyvinyl alcohol.

As for the catalyst for the acetalizing reaction, there may be mentioned hydrochloric acid or sulfuric acid. The amount of such acid to be used is generally 5 to 25% by weight, preferably 10 to 20% by weight on the total amount of the acetalizing reaction solution.

As mentioned before a pore producing agent may be employed, which is a substance to accelerate or promote the formation of uniform micropores in the polyvinyl acetalic layer. Examples of such pore forming agents are amylose-containing polysaccharide such as, for example, starch or dextrin or its derivative or a nonionic or anionic surface active agent. Among them, starch or dextrin is most preferable. The amount of use of such pore-forming agent is generally 0 to 200% by weight, preferably 50 to 150% by weight on the polyvinyl alcohol.

If desired a polyvinyl acetalic porous body in the form of a block may be separately prepared under the same conditions explained herein before. The porous block body, after being washed with water and dried, is cut into thin sheets and such sheet is bonded and laminated on one or both surfaces of the base fabric by a suitable adhesive such as polyvinyl, polyurethane, rubber or chlorosulfonated polyethylene. In such case, it is desirable to bond the sheet at spots instead of on the entire surface lest the gas-permeability should be reduced by the film of the adhesive material.

The porous surface layer of the sheet material as prepared in any of the above mentioned manners has an acetalization degree of 50 to 65% (mol), so that there is a disadvantage that it is so soft when wet that it has no practical strength as a leather substitute.

We have found that this drawback can be overcome by conducting reacetalization. Thus the acetalization degree of the polyvinyl acetalic porous layer may be increased up to 70 to 85% (mol) by dipping the material in a solution containing an aldehyde and an acid catalyst to effect the reacetalization. The conditions of the reacetalizing treatment may vary depending on the particular use of the final product and on the acetalization degree of the porous sheet to be reacetalized. However, it is desirable to conduct the reacetalization at a temperature of 40 to 60° C. for 5 to 30 hours by dipping the sheet material in a solution containing 5 to 10% by weight of the acid catalyst (e.g. sulfuric acid) and 3 to 10% by weight of the aldehyde (e.g. formaldehyde).

As explained above, it is desirable to increase the acetalization degree of the polyvinyl acetalic porous layer laminated on the base fabric to 70 to 85% (mol), more preferably 75 to 85% (mol). In this case, if the increased acetalization degree is less than 70% (mol), the mechanical strength when wet and the heat resistance cannot be increased to a satisfactory extent. On the contrary, even if it becomes more than 85% (mol), the performances will not be specifically deteriorated. But, in order to increase the acetalization degree to be more than 85%, severe treating conditions are required and therefore it is not practical.

The porous sheet material thus reacetalized is water-washed to remove the acid catalyst and aldehyde and is then dried.

The resulting porous sheet has an acetalization degree of 70 to 85% (mol), and is considerably hydrophobic, and therefore it is hard even when wet and is high in the wet mechanical strength and heat resistance. However, its porosity is as high as 60 to 90% and the pore diameter is also large so that its properties required for a leather substitute, that is, compression-resistance and feel are not sufficient.

We have found that this drawback can be overcome by heating the above sheet material under pressure or compression. By this press-heat treatment, there is obtained a leathery porous sheet in which the porosity is in the range of 30 to 50%, the feel and compression-resistance are increased and the tensile strength, tear strength, moisture-permeability and gas-permeability are excellent.

This hot-press treatment may be conducted in any suitable manner, for example, by means of heated rollers and hot presses. Futrher, if a roller engraved with a leather pattern is used, it will be also possible to make a porous sheet having a natural leather-like appearance.

The temperature and pressure to be applied in such case may vary depending on the use of the final product. However, it is preferable that hot-press treatment is conducted at a temperature of 50 to 150° C. under a pressure of 1 to 20 kg./cm.$^2$ for 1 to 20 minutes.

Since the sheet material to be hot-pressed has been improved in the heat-resistance due to the reacetalization treatment, the temperature to be applied in the hot-press treatment may vary over a wide range and the hot-press treatment can be conducted effectively and smoothly. Further, such thermodeformation and abnormal fusing as are seen in the case of conventional polyvinyl acetalic porous sheets do not noticeably occur.

The porous sheet material made by the method of the present invention can be further softened or lined or can have hairs planted according to the subsequent use.

The leathery porous sheet material of the present invention is very useful as a leather substitute for such uses as shoes, bags, interior decorations heat insulators, partition plates in bags and upholstery leathers inside hats.

EXAMPLE 1

4.5 kg. of perfectly saponified polyvinyl alcohol of a polymerization degree of 1400 were dissolved in hot water so as to be 65 liters. A pasty solution of potato starch containing 1.3 g. of a solid was added thereto, and water was added to adjust the total amount to be 78 liters. Then 13.7 kg. of 50% sulfuric acid and 5.9 kg. of 37% Formalin were added thereto and the solution was stirred to obtain solution for making a porous body of polyvinyl acetal.

This solution was fed at a predetermined rate by means of an acidproof pump, was made to flow down in the form of fine streams through acidproof nozzles having many fine orifices and onto a long Vinylon fabric (of warps and wefts of 30-denier single threads at a density of 70 threads of Kuremona #8003 produced by Kurashiki Rayon Company, Japan) set on a molding frame within a reaction vessel. The thickness of the applied solution layer was 5 mm.

Then, the solution-coated fabric was stayed in the reaction chamber at 50° C. for 10 hours to proceed the acetalization to obtain a laminate composed of the Vinylon textile fabric on which is firmly bonded a porous layer of polyvinyl acetal. The obtained porous layer was of a porosity of 86% and an acetalization degree of 61%. The acetalization degree was determined by the calculation of the amount of the aldehyde combined to the sample as determined by the quantitative analysis.

Then the laminate was washed with water and squeezed to a water content of 90% by means of compression rubber rollers.

Then the laminate was reacetalized at 48° C. for 8 hours in a reacetalizing bath consisting of an aqueous solution containing 7.5% by weight sulfuric acid and 6.7% by weight formaldehyde.

The reacetalized sheet material was washed with water and dried to obtain a porous layer of polyvinyl acetal hard even when wet and high in the waterproofness and heat resistance. The porous layer had a porosity of 86% and an acetalization degree of 80% (mol).

The reacetalized porous sheet was pressed by a steam-heated roller press at a temperature of 75° C. under a pressure of 10 kg./cm.$^2$ for 6 minutes to obtain a leathery porous sheet.

The resulting sheet was of a thickness of 0.8 mm., porosity of 41%, tensile strength (as measured by ASTM–D2209-64) of 276 kg./cm.$^2$ when dry and 130 kg./cm.$^2$ when wet. Further, in the 90-degree bending test (by using a U–F type folding endurance tester made by Ueshima Manufactory, Japan), it endured 3000 times of bending, still had no trouble and had a sufficient flexibility and excellent toughness as a leather substitute.

For comparison, a porous sheet (thickness of 0.85 mm.) was prepared in the same manner as mentioned above except that only the reacetalizing treatment was omitted. The resulting sheet was soft when wet, was of a tensile strength of 184 kg./cm.$^2$ when dry and 106 kg./cm.$^2$ when wet and tore at 2000 times of bending in the bending test. The porosity was 40.5% as evident from this result, by the reacetalizing treatment, the mechanical strength was remarkably increased.

Further, when the waterproof stability was investigated by measuring the rate of variation of the length in case each of the above mentioned samples was dipped in water at 50° C. for one month, the above mentioned control sample where the reacetalization was omitted showed 8.5% deformation, while the reacetalized sample of the present invention showed only 0.1% deformation.

For further comparison, the tensile strength of a sheet of a conventional porous body of polyvinyl acetal (an acetalization degree of 80% by mol and a porosity of 40%) not laminated on a base fabric was 24.0 kg./cm.$^2$ when dry and 16.5 kg./cm.$^2$ when wet.

The results of measuring the tear strengths (according to JIS-K-6550-1965) of the porous sheet of the present invention, a cow hyde (tanned with tannin) and a regenerated leather are shown in Table 1.

TABLE 1

| Samples: | Tear strength (kg./mm.) |
|---|---|
| Porous sheet of the present invention | 1.59 |
| Regenerated leather (robes) | 0.80 |
| Cow hyde (tanned with tannin) | 1.61 |

The above tear strength was measured as follows. Thus, a sample 100 mm. long and 25 mm. wide and having a notch 70 mm. long was torn longitudinally at a tearing rate of 150 mm./min. with a Shopper type tensile strength tester was measured.

As apparent also from the above mentioned results, the porous sheet of the present invention shows the same tear strength as of the cow hyde and is superior to the regenerated leather.

Further, the rate of variation of the dimension of a sample of 100×10 mm. was determined by heating it at 120° C. for 5 minutes to measure the thermal shrinkage (heatproofness). The results are shown in Table 2, wherein the porous sheet of the present invention showed substantially no dimension variation but the cow hyde and regenerated leather were noted to shrink considerably.

TABLE 2

| Samples | Thermal shrinkage | |
|---|---|---|
| | Longitudinal (percent) | Lateral (percent) |
| Porous sheet of the present invention | −0.15 | 0 |
| Regenerated leather (robes) | −5.2 | −4.0 |
| Cowhide (tanned with tannin) | −3.4 | −4.2 |

The porous sheet of the present invention was observed to have continuous micropores, to be thereby high in the moisture-permeability and to be particularly remarkably superior to the regenerated leather and polyurethane synthetic leather. This is demonstrated in Table 3. The moisture-permeability was determined according to JIS-K-6549-1965.

TABLE 3

| Samples: | Moisture-permeability (mg./cm.$^2$/hr.) |
|---|---|
| Porous sheet of the present invention | 8.0 |
| Cow hyde (tanned with tannin) | 7.0 |
| Regenerated leather | 3.0 |
| Polyurethane synthetic leather | 5.0 |

The results of testing the hygroscopicity of the porous sheet of the present invention as compared with those of the cow hyde and regenerated leather are shown in Table 4. The hygroscopicity was evaluated by the increase in the weight when the sample of 100×100 mm. was left in an atmosphere at 40° C. under a relative humidity of 90% for 5 hours.

TABLE 4

| Samples: | Hygroscopicity |
|---|---|
| Porous sheet of the present invention | 10.6 |
| Cow hyde (tanned with tannin) | 11.3 |
| Regenerated leather | 13.1 |

The results of measuring the rates of forced absorption of water in case the porous sheet of the present invention and above mentioned control samples (such as the cow hyde and regenerated leather) were forced to absorb sweat or water and the moisture dissipation (drying velocity) by drying them are shown in Table 5.

TABLE 5

| | Samples | | |
|---|---|---|---|
| | Porous sheet of the present invention | Cowhide (tanned with tannin) | Regenerated leather |
| Rate of forced absorption of water (percent) | 140.0 | 69.0 | 40.0 |
| Water content (percent) after air-drying for— | | | |
| 1 hour | 117.0 | 59.0 | 30.0 |
| 2 hours | 98.5 | 47.2 | 23.5 |
| 3 hours | 74.2 | 36.4 | 16.5 |
| 4 hours | 60.3 | 25.0 | 13.2 |
| 5 hours | 38.4 | 15.4 | 8.9 |
| 6 hours | 24.5 | 9.8 | 7.0 |
| Water content (percent) after air-drying for 8 hours | 10.1 | 7.0 | 5.0 |

In the above the water content was measured as follows. Thus, a test piece of 100×100 mm. was dipped in water at 20° C. for 24 hours. The piece was then taken out and squeezed under a fixed condition to obtain a rate of forced absorption of water. Then the wet piece was left to be air-dried at the room temperature of 15° C. to determine the water content.

As evident also from the above results, the porous sheet of the present invention has characteristics that it is comparatively low in the hygroscopicity but is remarkably higher in the rate of forced absorption of water or sweat than the cow hyde and regenerated leather and yet is very high in the drying velocity (water dissipating velocity). Therefore, there is a feature that, in case it is used in shoes, it will well absorb sweat and will give substantially no stuffy feeling. The sheet of the invention is further so tough and so high in the flexibility, waterproofness, moisture-permeability and heat-resistance that it is very useful as a leather substitute for bags, interior decorations and heat insulator.

EXAMPLE 2

4.3 kg. of perfectly saponified polyvinyl alcohol of a polymerization degree of 1700 were dissolved in hot water so as to be 60 liters, and a pasty solution of potato starch containing 1.2 kg. of a solid was added thereto. Water was added to make the total amount 80 liters to prepare a mixed solution. To this solution were added 18.2 kg. of 40% sulfuric acid and 6.5 kg. of 37% Formalin, and the solution was stirred to prepare a reaction solution. Then the solution was poured into a reaction vessel and was acetalized therein at 50° C. for 10 hours to obtain a porous body of polyvinyl acetal in the form of a block. The acetalization degree of said porous body was 62%. The block was well washed with water to remove the remaining starch, Formalin and sulfuric. It was dehydrated by a centrifugal separator, and dried at 80° C. The block body was cut into thin sheets (each 5 mm. in thickness).

Then this porous thin sheet (porosity 88%) was bonded on a fabric (warps and wefts of 20-denier double threads at a density of 24 threads) made of polyvinylidene fibers in such a manner that the pores may not be clogged at all.

The laminate was reacetalized at 48° C. for 11 hours in a reacetalizing bath consisting of an aqueous solution containing 7.5% sulfuric acid and 6.7% formaldehyde to obtain a porous sheet with a porous surface layer of polyvinyl acetal having a waterproof stability when wet.

The porous layer was of an acetalization degree of 83% and a porosity of 88%.

This reactalized laminate was heated by a hot press at 70° C. under a pressure of 12 kg./cm.² for 6 minutes to obtain a leathery porous sheet (porosity 45%). This sheet was hard and did not soften even when wet. The tensile strength measured in the same manner as in Example 1 was 132 kg./cm.² when dry and 107.0 kg./cm.² when wet. The tear strength was 1.55 kg./mm. The thermal shrinkage was 0%. The moisture-permeability was 8.1 mg./cm.²/hr. The hygroscopicity was 9.8%. The rate of forced absorption of water was 138%. When the water-containing sample was air-dried for 8 hours, the water content was 9.5%.

For comparison, a porous sheet obtained in the same manner except that only the reacetalization was omitted had a porosity of 44% and acetalization degree of 62% and remarkably swelled and softened when wet. The tensile strength was 64 kg./cm.² when wet and 120 kg./cm.² when dry. The tear strength was 0.98 kg./mm. The thermal shrinkage was 2.4% longitudinally. Further, its hygroscopicity was 11.5% and its moisture-permeability was only 6.9 mg./cm.²/hr.

The leathery porous sheet of the present invention was very useful for leathers, shoes and bags.

EXAMPLE 3

A solution for making a porous body of polyvinyl acetal prepared by the same composition and method as in Example 1 was put into a reaction kettle provided with a cooling device. The solution was warmed to 50° C. to allow the acetalization to proceed for 60 minutes while being stirred. The thus obtained solution of an acetalization degree of 30% (mol) was cooled to 30° C. to substantially stop the acetalizing reaction. The solution was applied to a base fabric by the same method as in Example 1. The fabric with the coating was subjected to further acetalization by heating at 60° C. for 15 minutes to obtain a laminate wherein a porous surface layer of polyvinyl acetal firmly adhered to the surface of the base fabric. Then the laminate was washed with water and dried. The resulting porous surface layer was of an acetalization degree of 56% and porosity of 84%.

Then the laminate was subjected to reacetalization at 50° C. for 8 hours in a reacetalizing bath consisting of an aqueous solution containing 7.5% by weight sulfuric acid and 7.0% by weight formaldehyde. The reacetalized product was then washed with water and dried to obtain a porous sheet with a polyvinyl acetal layer of an acetalization degree of 80.8% (mol) and a porosity of 84%.

Then the reacetalized sheet was hot-pressed under the same conditions as in Example 1 to obtain a porous sheet suitable as a leather material. The porosity of the sheet was 36%.

The performance and physical properties of this porous sheet were measured in the same manner as in Example 1. The tensile strength was 263 kg./cm.² when dry, and 128 kg./cm.² when wet. Its waterproofness at 50° C. was 0.1%. The tear strength was 1.58 kg./mm. The thermal shrinkage was 0%. The moisture-permeability was 8.5 mm./cm.²/hr. The hygroscopicity was 9.5%. The rate of forced absorption of water was 139%. When air-dried, it dried in 8 hours, indicating that its drying velocity (water dissipating velocity) was high.

The leathery porous sheet was very useful for making shoes and bags.

EXAMPLE 4

300 cc. of a solution for making a porous body of polyvinyl acetal prepared by the same composition and method as in Example 1 were uniformly sprinkled over the entire surface of the bottom of a molding frame of 300×400×150 mm. A vinylon fabric (of warps and wefts of 20-denier single threads at a density of 54 threads of Kuremona #8002 produced by Kurashiki Rayon Company, Japan) was then put on this solution layer. Further, 300 cc. of the same solution were uniformly sprinkled on the Vinylon fabric. Within the molding frame the acetalization was conducted in the same manner as in Example 1. The cured sheet was removed from the molding frame and washed with water and dried to obtain a porous sheet wherein a polyvinyl acetal layer is integrally bonded on each surface of the base fabric. The porosity of the porous layer was 86% and its acetalization degree was 60.0% (mol).

Then the reacetalization was conducted at 55° C. for 8 hours in a reacetalizing bath consisting of an aqueous solution containing 7.5% by weight sulfuric acid and 6.8% by weight formaldehyde. The reacetalized sheet was washed with water and dried to obtain a laminate or sheet having a porous layer of polyvinyl acetal of a porosity of 86% and acetalization degree of 79.5% (mol). Then the laminate was hot-pressed in the same manner as in Example 1 to obtain a porous sheet of a porosity of 43% and acetalization degree of 79.5%.

The resulting porous sheet was of a tensile strength of 110 kg./cm.² when wet and did not soften even when wet. The thermal shrinkage was 0% and the moisture-permeability was 8.8 mg./cm.²/hr.

The leathery porous sheet thus obtained was useful for making shoes and bags.

EXAMPLE 5

3.3 kg. of perfectly saponified polyvinyl alcohol of a polymerization degree of 1400 and 1.6 kg. of perfectly saponified polyvinyl alcohol of a polymerization degree of 500 were dissolved in hot water to obtain a 65 liters aqueous solution. A pasty solution of corn starch containing 2.2 kg. of a solid was added thereto and the mixture was diluted with water to 78 liters. Then 9.8 kg. of 50% sulfuric acid and 5.5 kg. of 37% Formalin were added and the solution was well stirred and mixed to obtain a solution for producing polyvinyl acetalic porous bodies.

Then 500 cc. of this solution were made to uniformly flow and spread over the entire surface of the bottom of a molding frame (reaction vessel) of 300×400×150 mm. and then a Vinylon nonwoven fabric (of 5 deniers, a fiber length of 30 mm. and a weight of 100 g./m.²) was put on the solution layer. Further, 500 cc. of the same solution were uniformly sprinkled on the nonwoven fabric. Then the acetalization was allowed to proceed within the molding frame at 60° C. for 7 hours. The cured product was removed from the molding frame and washed with water and dried to obtain a laminate consisting of a porous layer of polyvinyl acetal firmly bonded on said nonwoven fabric. The acetalization degree of the porous layer was 62% (mol) and its porosity was 85%.

Then the laminate was subjected to reacetalization at 60° C. for 5 hours in a reacetalizing bath consisting of an aqueous solution containing 8.9% by weight sulfuric acid and 7.7% by weight formaldehyde. After the reaction, the product was taken out and well water-washed and dried to obtain a sheet having an integrally bonded porous layer of polyvinyl acetal of an acetalization degree of 80.3% (mol) and porosity of 85%.

Then this laminate was hot-pressed under the same conditions as in Example 1 to obtain a leathery porous sheet material having a porosity of 42% and acetalization degree of 80.3% (mol). The tensile strength of this sheet material was 115 kg./cm.² when wet. Further, it did not soften and was hard even when wet. Its thermal shrinkage was 0.05% and its moisture-permeability was 8.5 mg./cm.²/hr.

The leathery porous sheet thus obtained was useful for making shoes and bags.

What we claim is:

1. A method for producing a leathery, porous sheet material laminate having a fibrous base layer comprising the steps of applying a porous polyvinyl acetalic layer having an acetalization degree of at least 50% mol and a porosity of at least 60% to at least one side of said base layer, applying an admixture of an aldehyde and an acid catalyst to said polyvinyl acetalic layer to reacetalize the said polyvinyl acetalic layer, continuing said reacetalization reaction until a predeterminted degree of reacetalization is reached, and then hot pressing said layers.

2. A method as claimed in claim 1 wherein the porous polyvinylacetalic layer is of a porosity of 60–90% and of an acetalization degree of 60–65% (mol).

3. A method as claimed in claim 1 wherein the reacetalization is conducted to increase the acetalization degree of the polyvinylacetalic layer up to 70–85% (mol).

4. A method as claimed in claim 1 wherein the hot-press treatment is conducted at a temperature of 50–150° C. under a pressure of 1–20 kg./cm.² to reduce the porosity of the porous layer to 30–50%.

5. A method as claimed in claim 1 wherein the laminate to be subjected to the reacetalization is prepared by applying to at least one surface of the fibrous base layer a solution containing polyvinyl alcohol having 0–10% (mol) of residual acetic acid group and 800–2500 of polymerization degree, an aldehyde in an amount of 5–15% by weight based on the polyvinyl alcohol and an inorganic acid catalyst, and acetalizing the solution on the base layer at 30–70° C. so as to form a porous polyvinylacetalic layer of a porosity of 60–90% and of an acetalization degree of 50–65% (mol).

6. A method as claimed in claim 1 wherein the laminate to be subjected to the reacetalization is prepared by pouring in a mold solution containing polyvinyl alcohol having 0–10 (mol) percent of residual acetic acid group and 800–2500 of polymerization degree, an aldehyde in an amount of 5–15% by weight based on the polyvinyl alcohol and an inorganic acid catalyst, acetalizing the solution within the mold at 30–70° C. to form a porous block of polyvinylacetal having a porosity of 60–90% and an acetalization degree of 50–65% (mol), cutting the porous block into thin sheets, and bonding the sheet to at least one surface of the fibrous base layer.

7. A method as claimed in claim 5 wherein the solution further contains a pore-forming agent.

8. A method as claimed in claim 6 wherein the solution further contains a pore-forming agent.

9. A method as claimed in claim 7 wherein the pore-forming agent is selected from the group consisting of amylose-containing polysaccharides, their derivatives and non-ionic and anionic surfactants.

10. A method as claimed in claim 8 wherein the pore-forming agent is selected from the group consisting of amylose-containing polysaccharides, their derivatives and non-ionic and anionic surfactants.

11. A method as claimed in claim 3 wherein the reacetalization is conducted by treating the laminate with a solution containing 3–10% by weight of an aldehyde and 5–10% by weight of an acid catalyst at a temperature of 40–60° C.

References Cited
UNITED STATES PATENTS

| | | | |
|---|---|---|---|
| 2,994,617 | 8/1961 | Proctor | 156—77X |
| 2,994,630 | 8/1961 | Osborn | 156—77X |
| 3,170,832 | 2/1965 | Wilson et al. | 156—245X |
| 3,175,936 | 3/1965 | Squier et al. | 156—79 |
| 3,193,438 | 7/1965 | Schafer | 156—245X |
| 3,382,302 | 5/1968 | Marzocchi | 156—78 |
| 3,459,611 | 8/1969 | Joseph et al. | 156—245X |
| 3,483,069 | 12/1969 | Cairns et al. | 156—78X |

LELAND A. SEBASTIAN, Primary Examiner

S. J. LECHERT, Jr., Assistant Examiner

U.S. Cl. X.R.

156—242, 245, 254, 256, 307; 161—160, DIG. 2